United States Patent [19]

Fogle et al.

[11] 4,148,678

[45] Apr. 10, 1979

[54] HAND-HELD LABELER

[75] Inventors: Ronald L. Fogle, Lebanon; Larry D. Strausburg, Miamisburg, both of Ohio

[73] Assignee: Monarch Marking Systems, Inc., Dayton, Ohio

[21] Appl. No.: 832,695

[22] Filed: Sep. 12, 1977

[51] Int. Cl.[2] .............................................. B32B 31/00

[52] U.S. Cl. ................................... 156/384; 156/541; 156/DIG. 49

[58] Field of Search ............... 156/384, 540, 541, 542, 156/DIG. 26, DIG. 33, DIG. 37, DIG. 48, DIG. 49; 242/71.1, 197

[56] References Cited

U.S. PATENT DOCUMENTS

| | | | |
|---|---|---|---|
| 2,102,970 | 12/1937 | Peterson | 156/541 |
| 3,065,889 | 11/1962 | Grosser | 156/DIG. 48 |
| 3,222,242 | 12/1965 | Ingalls et al. | 156/DIG. 48 |
| 3,440,123 | 4/1969 | Hamisch | 156/384 |
| 3,813,275 | 5/1974 | Weick et al. | 156/543 |

*Primary Examiner*—Caleb Weston
*Attorney, Agent, or Firm*—Joseph J. Grass

[57] ABSTRACT

There is disclosed a hand-held labeling machine which has a housing that carries a supply roll of labels. The labels can be successively dispensed in response to actuation of a manually operable actuator. The supply roll is prevented from unraveling by means of a U-shaped retainer which is movable between a first position out of straddling relationship with the roll to enable a full label roll to be inserted into an access opening in the housing and a second position in which the retainer straddles the label roll.

20 Claims, 5 Drawing Figures

HAND-HELD LABELER

BACKGROUND OF THE INVENTION

1. Field of the Invention

This invention relates to the art of hand-held label applying machines.

2. Brief Description of the Prior Art

U.S. Pat. No. 4,024,005 to William A. Jenkins granted May 17, 1977 discloses a label printing and applying apparatus having a housing or frame with an access opening and a subframe disposed in the housing for supporting a roll of labels. A portion of a full label roll extends outside the housing.

Some prior art labelers enclose the entire label roll in a pivotally mounted box-like enclosure or cover. The cover is pivoted to an open position when it is desired to load a new roll of labels into the labeler and thereupon the cover can be moved to the closed position in which the label roll is retained in the labeler.

SUMMARY OF THE INVENTION

This invention relates to the type of hand-held labeling machine in which at least a portion of a label roll extends outside a housing. The label roll is rotatably mounted in the housing. According to the invention a retainer is movable between one position in which a label roll can be inserted into an access opening in the housing and another position in straddling relationship with respect to the label roll to prevent the roll from unraveling. The retainer in accordance with one embodiment of the invention is wire-like in construction and has a generally U-shaped configuration. The retainer has a pair of arms which extend along opposite sides of the label roll and a bight that joins the arms.

DETAILED DESCRIPTION OF A PREFERRED EMBODIMENT

Figure 1:
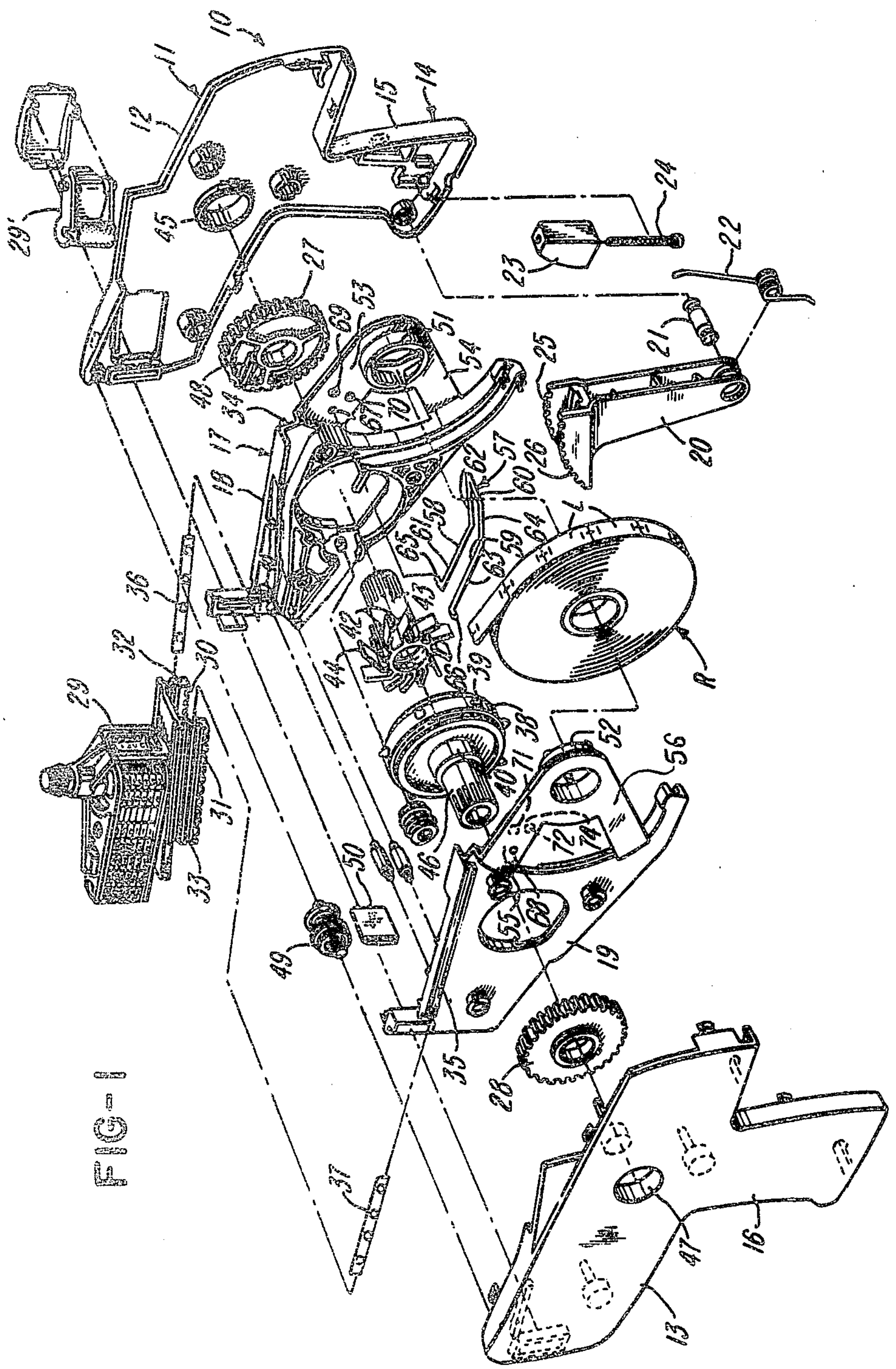
FIG. 1 is an exploded perspective view of a labeler in accordance with the invention.

With reference to FIG. 1, there is shown a labeler generally indicated at 10 including a housing or frame generally indicated at 11 including generally mirror-image housing sections 12 and 13. The housing sections 12 and 13 provide a handle 14 composed of handle portions 15 and 16. The housing mounts a subframe generally indicated at 17 which includes subframe sections 18 and 19. The subframe sections 18 and 19 extend in generally side-by-side relation and are substantially mirror images. An actuator 20 pivotally mounted on a pin 21 to the handle 14 is urged counterclockwise by a spring 22. The clockwise pivoting of the actuator 20 is limited by an adjustable stop 23 which is movable by rotating a screw 24. The actuator 22 has a pair of gear segments or sections 25 and 26 in mesh with respective gears 27 and 28. A print head 29 has a pair of gear segments or racks which mesh with respective gears 27 and 28. The print head 29 has guide grooves 32 and 33 and the subframe sections 18 and 19 have guide grooves 34 and 35 for receiving respective ball bearing strips 36 and 37 so that the print head 29 is mounted for straight-line reciprocating movement.

A feed wheel 38 has teeth 39 and a gear mounting portion 40 for receiving the gear 28. A ratchet wheel 41 having teeth 42 has a gear mounting portion 43 and a multiplicity of pawls 44. The pawls 44 form part of a mechanism for adjusting the ratchet wheel 41 relative to the feed wheel 38. The portion 43 is rotatably mounted in a hole 45 in the housing section 12 and the feed wheel 38 also has a portion 46 rotatably mounted in a hole 47 in the housing section 13. The gear 27 carries a pawl 48 cooperable with the ratchet teeth 42.

The housing 11 rotatably mounts an applicator roll 49. The subframe 17 mounts a platen 50 with which the print head 29 cooperates.

A label roll R is suitably mounted to portions 51 and 52 of the subframe. The portions 51 and 52 are mounted on flexible resilient arms 53 and 54 and 55 and 56.

U.S. Pat. No. 4,024,005 shows and describes the structure of the labeler 10 in additional detail and is thus incorporated herein by reference.

Figure 2:
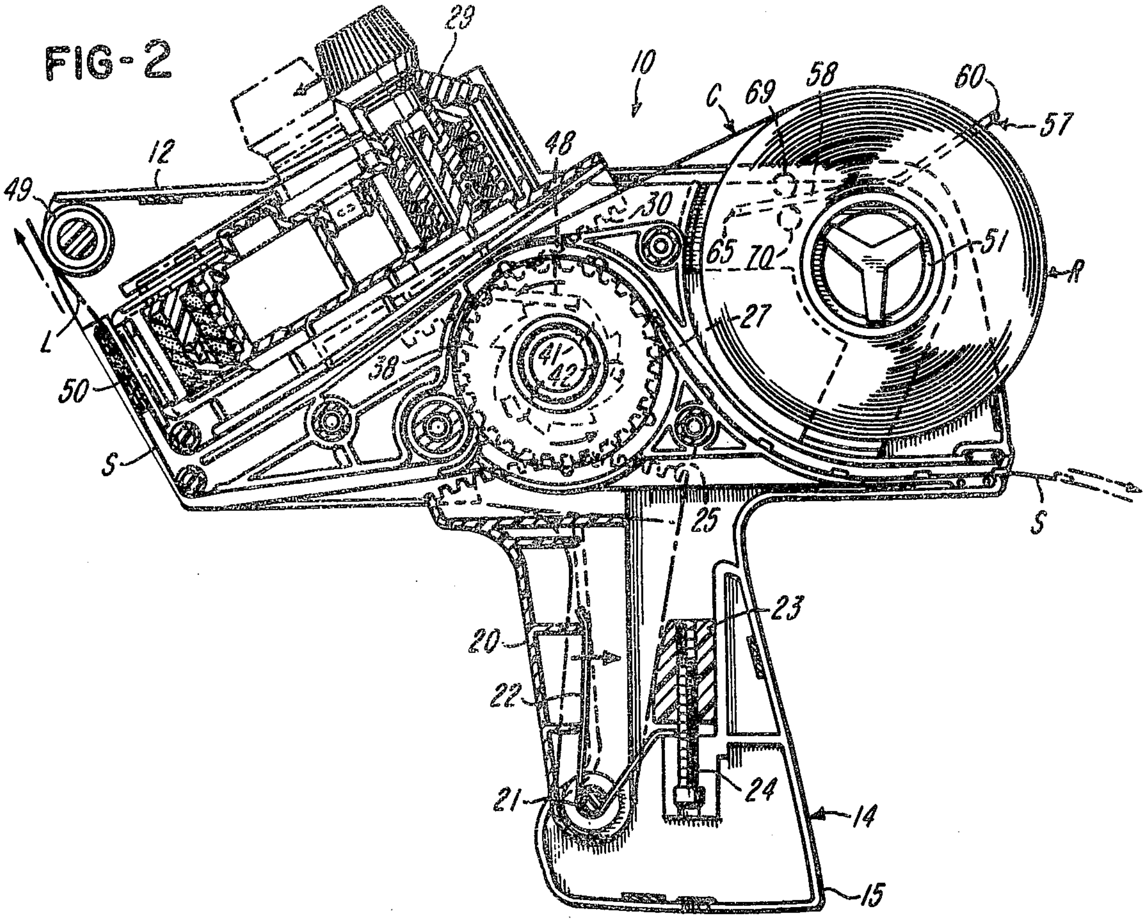
FIG. 2 is a side elevational view, partly in section, of the labeler.
Figure 3:
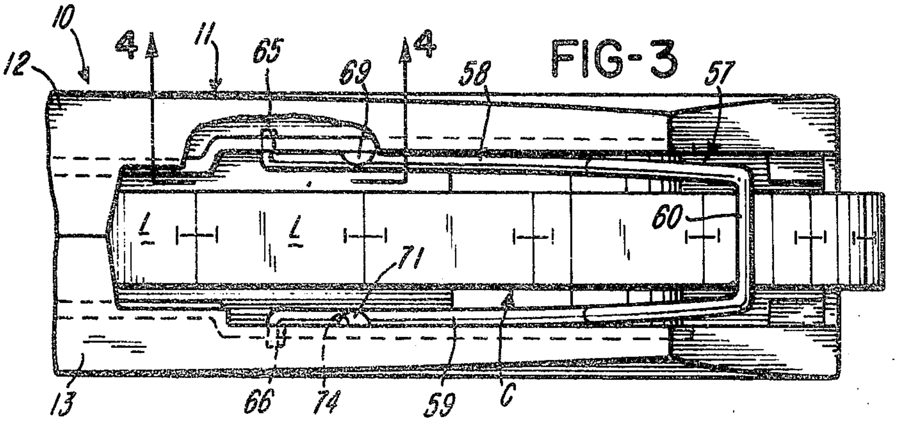
FIG. 3 is a top plan view of a fragment of the labeler.
Figure 4:
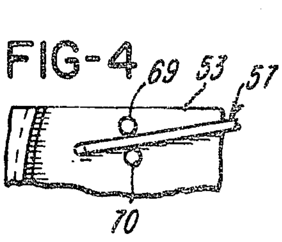
FIG. 4 is a sectional view taken along line 4—4 of FIG. 3, showing the retainer in one position.
Figure 5:
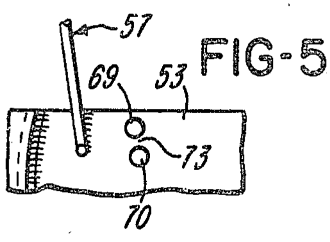
FIG. 5 is a view similar to FIG. 4, but showing the retainer in another position.

A retainer generally indicated at 57 is shown to have a pair of arms 58 and 59 joined by a bight 60 to provide a generally U-shaped arrangement. The retainer is preferably of one-piece construction and preferably has a constant cross-section. The retainer is wire-like in appearance but can be made of any suitable flexible resilient material, such as spring steel or plastic. The arm 58 has arm portions 61 and 62 which are joined and make an obtuse angle with each other, and the arm 59 has arm portions 63 and 64 which are joined and make an obtuse angle with each other. Portions 61 and 63 are parallel to each other and portions 62 and 64 are parallel to each other. The portions 62 and 64 are joined to the bight 60. The portions 61 and 63 have respective out-turned portions or connectors 65 and 66 received in respective aligned connectors or holes 67 and 68. The portions 61 and 63 are inside the housing 11 in the position shown in FIG. 2. Thus, the connectors 65 and 66 pivotally mount the retainer 57 in the holes 67 and 68. As seen, the retainer 57 is mounted to the subframe 17 at a location remote from the handle 14. The arms 53 and 55 of the subframe section 18 and 19 have pairs of projections 69 and 70, and 71 and 72, which define respective grooves 73 and 74. The arms 58 and 59 are relatively close and generally parallel to the sides of the roll R. The bight 60 is preferably slightly spaced from the outer periphery of a full label roll R as shown in FIG. 2. The bight 60 extends generally transversely to the axis of the roll R. If excessive unwinding occurs the bight 60 offers resistance to further unwinding.

Other embodiments and modifications of this invention will suggest themselves to those skilled in the art, and all such of these as come within the spirit of this invention are included within its scope as best defined by the appended claims.

We claim:

1. Hand-held apparatus for applying pressure sensitive labels releasably secured to a web of supporting material, the web being wrapped into a roll, the apparatus comprising: a housing having a handle, the housing having an access opening into which a label roll of said labels can be inserted, means for mounting the label roll in the housing in a position in which a substantial part of a full label roll is outside the housing, a delaminator mounted by the housing, an applicator disposed adjacent the delaminator, a driver for advancing the web, means defining a feed path for the web from the label roll, to the delaminator where labels are successively peeled from the web, to the driver, and to a place of exit from the housing, means for moving the driver to advance the web including a manually engageable actuator disposed at the handle, a generally U-shaped retainer for straddling the part of the label roll outside the housing to prevent unraveling, the retainer having a pair of arms that extend along opposite sides of the label roll and a bight connecting the arms, means for movably mounting the retainer on the housing for movement between a first position out of straddling relationship to the roll to enable a full label roll to be inserted into the access opening and a second position in which the retainer straddles the label roll, and means for releasably holding the retainer in the second position.

2. Hand-held apparatus as defined in claim 1, the mounting means including a first connector means on each arm, each first connector means being spaced from the bight, the mounting means further including a pair of second connector means carried by the housing with which the first connector means engage, the retainer being constructed of flexible resilient material so that the arms can be manually deflected to enable first and second connector means to be movably coupled to each other.

3. Hand-held apparatus as defined in claim 2, wherein the retainer is integral with the first connector means.

4. Hand-held apparatus as defined in claim 1, wherein the retainer is of one-piece construction.

5. Hand-held apparatus as defined in claim 1, wherein the releasable holding means includes means providing a groove in which at least one of the arms is received when the retainer is in the second position, the retainer being resilient to enable the retainer to deflect to enable the retainer to be moved between the second position and the first position.

6. Hand-held apparatus as defined in claim 1, wherein the bight is spaced from the outer periphery of the label roll.

7. Hand-held apparatus as defined in claim 1, wherein the bight is disposed close enough to the outer periphery of the label roll to contact the outer wrap of the label roll should excessive unwinding of the label roll occur, thereby inhibiting further unwinding.

8. Hand-held apparatus as defined in claim 1, wherein the retainer has a generally constant cross-section throughout its length.

9. Hand-held apparatus as defined in claim 1, wherein the arms extend generally parallel to the side of the label roll and the bight extends generally transversely to the axis of the label roll.

10. Hand-held apparatus as defined in claim 1, wherein the mounting means mounts the retainer to the housing at a location remote from the handle.

11. Hand-held apparatus as defined in claim 1, wherein the arms have two generally parallel first portions connected to the bight and two generally parallel second portions connected to the respective first portions and movably connected to the housing, the second portions being disposed essentially entirely within the confines of the housing when the retainer is in the second position.

12. Hand-held apparatus for applying pressure sensitive labels releasably secured to a web of supporting material, the web being wrapped into a roll, the apparatus comprising: a housing having a handle, the housing having an access opening into which a label roll of said labels can be inserted, means for mounting the label roll in the housing in a position in which a substantial part of a full label roll is outside the housing, a delaminator mounted by the housing, an applicator disposed adjacent the delaminator, a driver for advancing the web, means defining a feed path for the web from the label roll, to the delaminator where labels are successively peeled from the web, to the driver, and to a place of exit from the housing, means for moving the driver to advance the web including a manually engageable actuator disposed at the handle, a retainer comprising a wire-like member for straddling the roll and mounted to the housing between a first position and a second position, the roll being insertable into the housing onto the mounting means when the retainer is in the first position and the roll is prevented from unraveling when the retainer is in the second position, and means for releasably holding the retainer in the second position.

13. Hand-held apparatus as defined in claim 12, wherein the retainer is of one-piece construction.

14. Hand-held apparatus as defined in claim 12, wherein the retainer is generally U-shaped.

15. Hand-held apparatus as defined in claim 12, wherein the retainer has a pair of integral connector portions, wherein the housing has means providing a pair of holes which receive the connector portions for pivotally mounting the retainer.

16. Hand-held apparatus as defined in claim 12, wherein the retainer is constructed from a single length of wire.

17. Hand-held apparatus as defined in claim 12, wherein the housing has a pair of opposite holes, the retainer being of one-piece construction and having a generally U-shaped portion and a pair of turned-out end portions, wherein the end portions are received in the holes for pivotally mounting the retainer, wherein the retainer is sufficiently flexible and resilient to enable the retainer to flex so that the end portions can be inserted into the holes and the resiliency of the retainer enables the end portions to be retained in the holes.

18. Hand-held apparatus as defined in claim 17, wherein releasable holding means includes means providing at least one groove, the retainer being in the groove in the second position but the retainer being movable out of the groove to the first position due to resilient yielding of the retainer.

19. Hand-held apparatus for applying pressure sensitive labels releasably secured to a web of supporting material, the web being wrapped into a roll, the apparatus comprising: a housing having a handle, a subframe disposed in the housing, the subframe having a pair of side-by-side subframe sections, the housing having an access opening into which a label roll of said labels can be inserted, means on the subframe for mounting the label roll in a position in which a substantial part of a full label roll is outside the housing, a delaminator mounted by the subframe, a platen and a cooperable print head mounted by the subframe, an applicator disposed adjacent the delaminator, a driver for advancing the web, means defining a feed path for the web in the subframe from the label roll, to between the platen and the print head, to the delaminator where labels are successively peeled from the web, to the driver, and to a place of exit from the housing, means for moving the driver to advance the web including a manually engageable actuator disposed at the handle, a generally U-shaped retainer for straddling the part of the label roll outside the housing to prevent the roll from unraveling along opposite sides of the label roll, the retainer having a bight connecting the arms, means for movably mounting the retainer on the subframe for movement between a first position out of straddling relationship to enable a full label roll to be inserted into the access opening and a second position in which the retainer straddles the label roll, and means for releasably holding the retainer in the second position.

20. Hand-held apparatus for applying pressure sensitive labels releasably secured to a web of supporting material, the web being wrapped into a roll, the apparatus comprising: a housing having a handle, a subframe disposed in the housing, the subframe having a pair of side-by-side subframe sections, the housing having an access opening through which a label roll of said labels can be inserted, means on the subframe for mounting the label roll in a position in which a substantial part of a full label roll is outside the housing, a delaminator mounted by the subframe, a platen and a cooperable print head mounted by the subframe, an applicator disposed adjacent the delaminator, a driver for advancing the web, means defining a feed path for the web in the subframe from the label roll, to between the platen and the print head, to the delaminator where labels are successively peeled from the web, to the driver, and to a place of exit from the housing, means for moving the driver to advance the web including a manually engageable actuator disposed at the handle, a retainer comprising a wire-like member for straddling the roll and movably mounted to the subframe between a first position and a second position, the roll being insertable into the housing onto the mounting means when the retainer is in the first position and the roll is prevented from unraveling when the retainer is in the second position, and means for releasably holding the retainer in the second position.

* * * * *